(12) United States Patent
Shimizu

(10) Patent No.: US 9,152,261 B2
(45) Date of Patent: Oct. 6, 2015

(54) DISPLAY INPUT DEVICE, AND IMAGE FORMING APPARATUS INCLUDING TOUCH PANEL PORTION

(71) Applicant: KYOCERA Document Solutions Inc., Osaka (JP)

(72) Inventor: Takeo Shimizu, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 13/923,286

(22) Filed: Jun. 20, 2013

(65) Prior Publication Data

US 2013/0342871 A1    Dec. 26, 2013

(30) Foreign Application Priority Data

Jun. 26, 2012    (JP) .................................. 2012-143166

(51) Int. Cl.
```
G06F 3/12      (2006.01)
G06F 3/041     (2006.01)
G03G 15/00     (2006.01)
G06F 3/0488    (2013.01)
H04N 1/00      (2006.01)
G06F 3/01      (2006.01)
```

(52) U.S. Cl.
CPC ............ *G06F 3/041* (2013.01); *G03G 15/5016* (2013.01); *G06F 3/0488* (2013.01); *G06F 3/1296* (2013.01); *G06F 3/017* (2013.01); *G06F 2203/04807* (2013.01); *G06F 2203/04808* (2013.01); *H04N 1/00204* (2013.01); *H04N 1/00411* (2013.01)

(58) Field of Classification Search
USPC ........... 358/1.13, 1.15; 399/81; 715/838, 840, 715/845, 847, 863; 345/634, 636, 655, 670, 345/173
See application file for complete search history.

(56) References Cited

U.S. PATENT DOCUMENTS

| | | | |
|---|---|---|---|
| 6,958,749 B1* | 10/2005 | Matsushita et al. | 345/175 |
| 8,823,743 B2* | 9/2014 | Oda et al. | 345/634 |
| 2004/0021643 A1 | 2/2004 | Hoshino et al. | |
| 2005/0259087 A1 | 11/2005 | Hoshino et al. | |
| 2010/0131880 A1* | 5/2010 | Lee et al. | 715/769 |
| 2011/0055773 A1 | 3/2011 | Agarawala et al. | |
| 2011/0066931 A1* | 3/2011 | Kim et al. | 715/205 |
| 2012/0154447 A1 | 6/2012 | Kim et al. | |
| 2012/0236037 A1* | 9/2012 | Lessing et al. | 345/661 |

FOREIGN PATENT DOCUMENTS

| | | |
|---|---|---|
| JP | 2004070492 A | 3/2004 |
| JP | 2012027528 A | 2/2012 |
| WO | 2011031492 A1 | 3/2011 |

* cited by examiner

*Primary Examiner* — Vu B Hang
(74) *Attorney, Agent, or Firm* — Alleman Hall McCoy Russell & Tuttle LLP

(57) ABSTRACT

A display input device includes a display portion and a touch panel portion. The display portion displays a screen on which objects are provided. The touch panel portion is provided on the display portion and detects a plurality of touched positions being touched by a user. After a multipoint touching operation of touching a plurality of points on the touch panel portion at the same time, when an operation of moving objects that are movement targets among the objects being displayed is performed on the touch panel portion, if the distance between two points among the plurality of points touched by the multipoint touching operation is equal to or larger than a predetermined threshold distance, the display portion collectively moves all the objects that are the movement targets.

16 Claims, 13 Drawing Sheets

DISPLAY INPUT DEVICE, AND IMAGE FORMING APPARATUS INCLUDING TOUCH PANEL PORTION

INCORPORATION BY REFERENCE

This application is based upon and claims the benefit of priority from the corresponding Japanese Patent Application No. 2012-143166 filed on Jun. 26, 2012, the entire contents of which are incorporated herein by reference.

BACKGROUND

The present disclosure relates to a display input device and an image forming apparatus including a touch panel portion.

An image forming apparatus has a plurality of setting items whose setting values can be changed upon execution of a job. Therefore, the image forming apparatus includes a display input device that accepts instructions such as an instruction to select a setting item whose setting value is to be changed among the plurality of setting items and an instruction to input a setting value of the selected setting item.

The display input device of the image forming apparatus may have, besides a hardware key, a display portion with a touch panel on which a software key, a message, or the like is displayed. Such a display input device displays a software key for accepting various settings on the display portion, and detects a software key touched via the touch panel, based on the output of the touch panel.

In addition, some display input devices allow an object (electronic label, etc.) created by a user to be pasted on various display screens. However, if a plurality of objects is pasted, it becomes difficult to see a software key, a message, or the like displayed on a background screen. Therefore, normally, the display portion with the touch panel accepts an object movement operation of moving an object.

For example, in order to move an object, a user touches the display position of an object that is a movement target, moves the touched position to a desired position while keeping the touched state, and then releases the touched state, whereby the object that is a movement target can be moved to the desired position. That is, the object is moved by a drag-and-drop operation.

SUMMARY

A display input device according to one aspect of the present disclosure includes a display portion and a touch panel portion. The display portion displays a screen on which objects are provided. The touch panel portion is provided on the display portion and detects a plurality of touched positions being touched by a user. After a multipoint touching operation of touching a plurality of points on the touch panel portion at the same time, when an operation of moving objects that are movement targets among the objects being displayed is performed on the touch panel portion, if the distance between two points among the plurality of points touched by the multipoint touching operation is equal to or larger than a predetermined threshold distance, the display portion collectively moves all the objects that are the movement targets.

An image forming apparatus according to another aspect of the present disclosure includes a display portion and a touch panel portion. The display portion displays a screen on which objects are provided. The touch panel portion is provided on the display portion and detects a plurality of touched positions being touched by a user. After a multipoint touching operation of touching a plurality of points on the touch panel portion at the same time, when an operation of moving objects that are movement targets among the objects being displayed is performed on the touch panel portion, if the distance between two points among the plurality of points touched by the multipoint touching operation is equal to or larger than a predetermined threshold distance, the display portion collectively moves all the objects that are the movement targets.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

[Entire Configuration of Image Forming Apparatus]

Hereinafter, an image forming apparatus (multifunction peripheral) capable of executing a plurality of types of functions such as a copy function, a transmission (scan) function, a fax function, and a box function will be described as an example. It is noted that the box function is a function of storing image data in a storage area (for example, a folder provided in a storage portion 113 described later) referred to as a box registered in advance or performing printing based on the stored image data.

Figure 1:
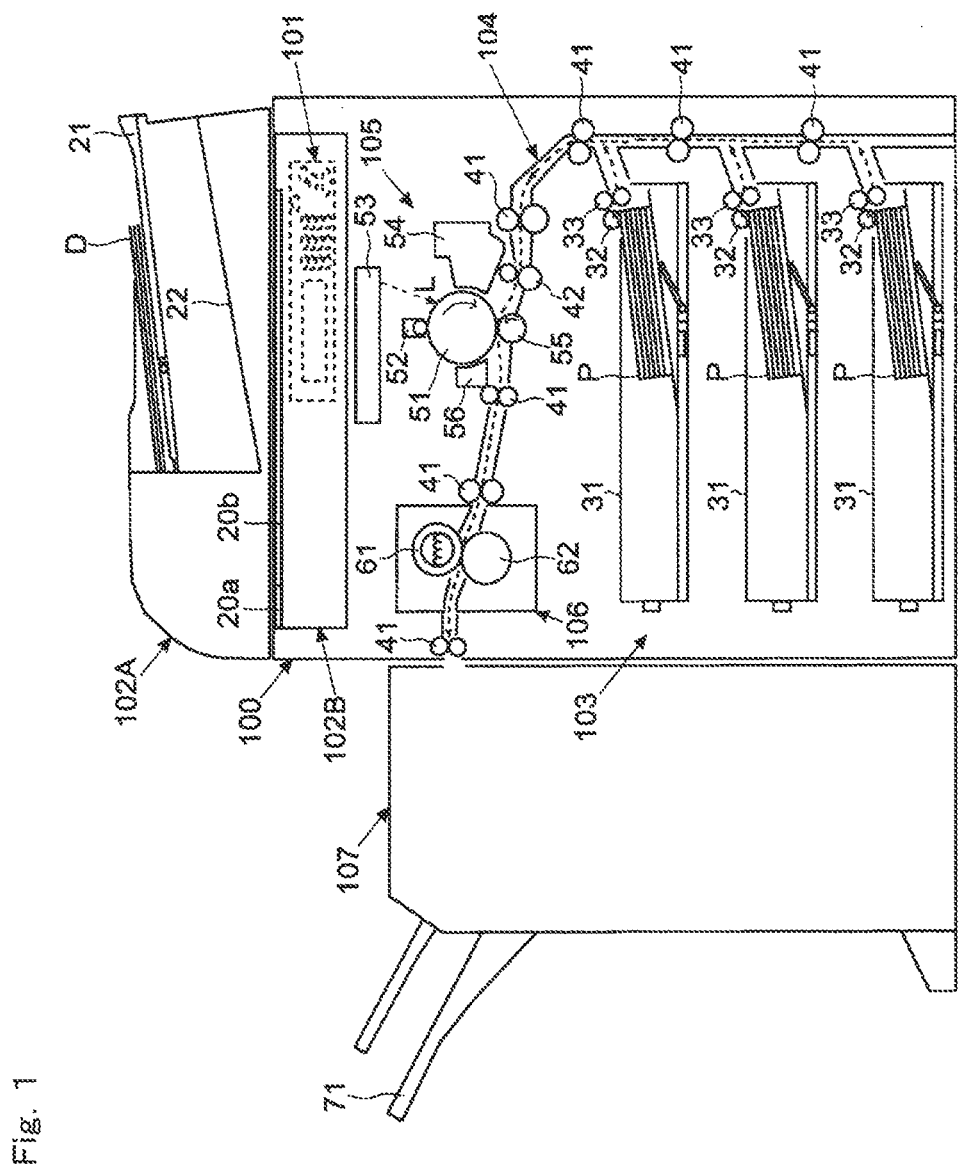
FIG. 1 is a schematic diagram of an image forming apparatus including a display input device according to an embodiment of the present disclosure.

As shown in FIG. 1, an image forming apparatus 100 of the present embodiment includes an operation panel 101 (corresponding to a "display input device"), a document sheet conveying portion 102A, an image reading portion 102B, a sheet feed portion 103, a paper sheet conveying portion 104, an image forming portion 105, a fixing portion 106, a post-processing portion 107, and the like.

Figure 2:
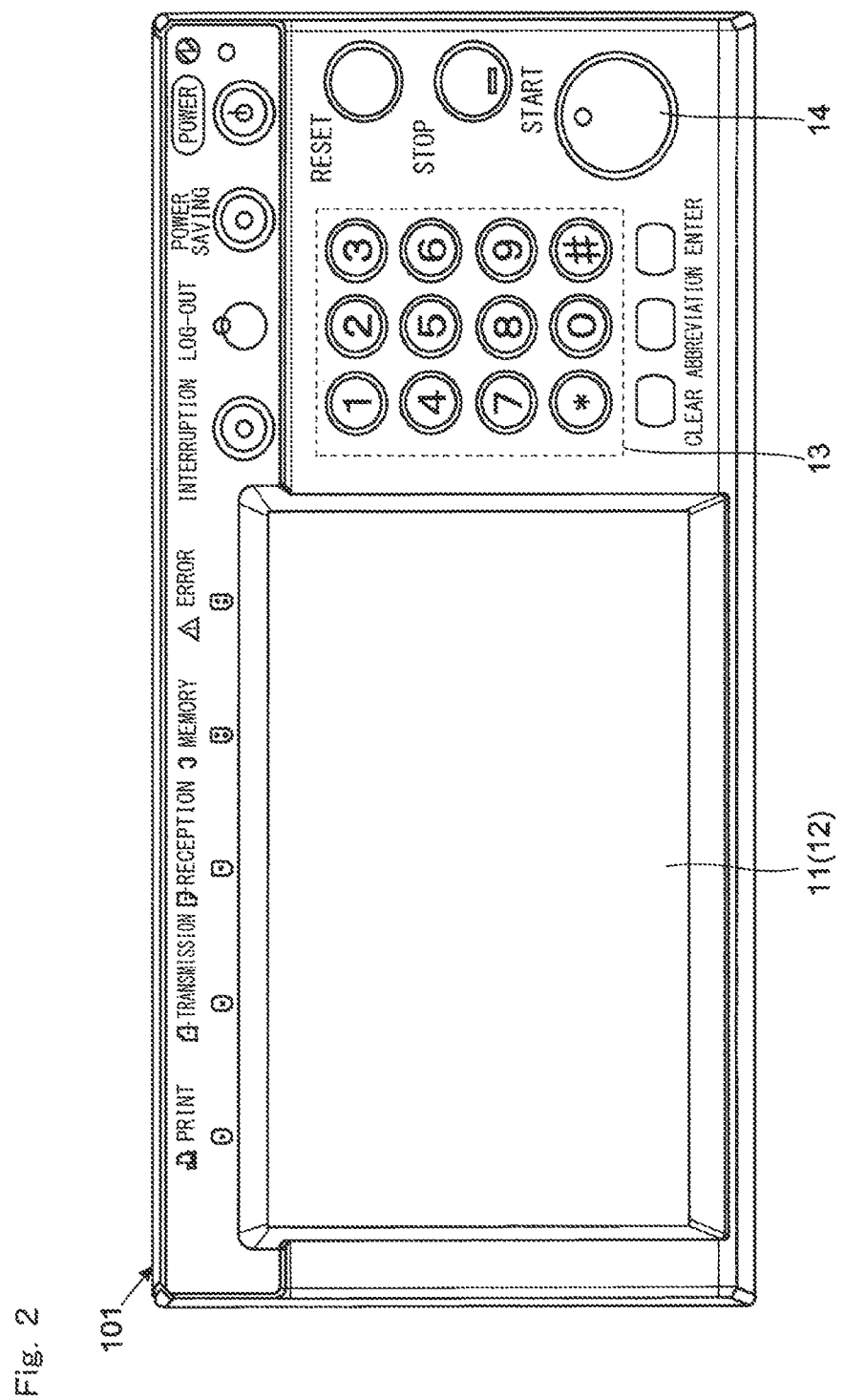
FIG. 2 is a detail diagram of the display input device of the image forming apparatus shown in FIG. 1.

The operation panel 101 is, for example, provided on the front surface side of the apparatus. As shown in FIG. 2, the operation panel 101 has a liquid crystal display portion 12 (corresponding to a "display portion"). A touch panel portion 11 is provided on the display surface of the liquid crystal display portion 12. The touch panel portion 11 is a multi-touch panel capable of, when a user has touched a plurality of positions on the display surface of the liquid crystal display portion 12, detecting the plurality of touched positions at the same time. The liquid crystal display portion 12 displays a screen on which, for example, a message and/or a software key that accepts an input operation (touching operation) from a user are provided. It is noted that the screen displayed on the liquid crystal display portion 12 will be described later in detail. The touch panel portion 11 covering the display surface of the liquid crystal display portion 12 is provided for detecting a software key designated by a user (a software key touched by a user via the touch panel portion 11). In addition, the operation panel 101 has provided thereon hardware keys such as a numeric keypad 13 that accepts a numeric input and/or a start key 14 that accepts an instruction to start function execution.

Returning to FIG. 1, the document sheet conveying portion 102A is openable and closable via a rotation shaft (not shown) provided on the apparatus back surface side of the image reading portion 102B. The document sheet conveying portion 102A draws a document sheet D set on a document sheet set tray 21, causes the document sheet D to pass on conveying reading contact glass 20a, and discharges the document sheet D to the document sheet discharge tray 22. In addition, the document sheet conveying portion 102A also has a function of pressing the document sheet D placed on placement reading contact glass 20b.

The image reading portion 102B reads the document sheet D to generate image data. In the image reading portion 102B, optically-relevant members such as an exposure lamp, a mirror, a lens, and an image sensor are provided though not shown. The image reading portion 102B radiates light onto the document sheet D passing on the conveying reading contact glass 20a or the document sheet D placed on the placement reading contact glass 20b. Then, the image reading portion 102B performs A/D conversion for an output value of the image sensor receiving light reflected from the document sheet D, thereby generating image data. Thus, the image forming apparatus 100 can perform printing based on the image data obtained by a reading operation (scanning) of the document sheet D performed by the image reading portion 102B. In addition, the image forming apparatus 100 can also store the image data obtained by the scanning.

The sheet feed portion 103 has a plurality of cassettes 31 which contain paper sheets P, and supplies the paper sheets P contained in the plurality of cassettes 31 to the paper sheet conveying portion 104. In the sheet feed portion 103, pick-up rollers 32 that draw the contained paper sheets P, and separation roller pairs 33 that prevent the paper sheets P from being conveyed redundantly are provided.

The paper sheet conveying portion 104 conveys the paper sheet P inside the image forming apparatus 100. Specifically, the paper sheet P supplied from the sheet feed portion 103 is conveyed by the paper sheet conveying portion 104, whereby the paper sheet P passes through the image forming portion 105 and the fixing portion 106 in this order. In the paper sheet conveying portion 104, a plurality of conveying roller pairs 41 that convey the paper sheet P are provided. Further, in the paper sheet conveying portion 104, a registration roller pair 42 is also provided that causes the paper sheet P to stand by just before the image forming portion 105 and conveys the paper sheet P to the image forming portion 105 at a predetermined timing.

The image forming portion 105 forms a toner image based on image data, and transfers the toner image onto the paper sheet P. The image forming portion 105 includes a photosensitive drum 51, a charging device 52, an exposure device 53, a developing device 54, a transfer roller 55, a cleaning device 56, and the like.

In a forming process of a toner image and a transfer process of the toner image, first, the photosensitive drum 51 is rotationally driven, and the surface of the photosensitive drum 51 is charged at a predetermined potential by the charging device 52. In addition, the exposure device 53 outputs a light beam L based on image data, thereby scanning and exposing the surface of the photosensitive drum 51 with the light beam L. Thus, an electrostatic latent image is formed on the surface of the photosensitive drum 51. The developing device 54 supplies toner to the electrostatic latent image formed on the surface of the photosensitive drum 51, thereby developing an image.

The transfer roller 55 can be rotated while pressing the surface of the photosensitive drum 51. Further, a predetermined voltage is applied to the transfer roller 55. In this state, the registration roller pair 42 causes the paper sheet P to proceed between the transfer roller 55 and the photosensitive drum 51 at a predetermined timing. Thus, the toner image on the surface of the photosensitive drum 51 is transferred onto the paper sheet P. Then, after the transfer process of the toner image is finished, the cleaning device 56 eliminates residual toner on the surface of the photosensitive drum 51.

The fixing portion 106 heats and pressurizes the toner image transferred onto the paper sheet P, thereby fixing the toner image on the paper sheet P. The fixing portion 106 includes a fixing roller 61 having a heat generation source, and a pressure roller 62 to be pressed to the fixing roller 61.

The paper sheet P on which the toner image has been transferred passes between the fixing roller 61 and the pressure roller 62, whereby the paper sheet P is heated and pressed. Thus, the toner image is fixed on the paper sheet P, and the printing is completed.

The post-processing portion 107 receives the printed paper sheet P from the fixing portion 106, and performs post-processing such as sorting processing, stapling processing, and punching processing, for the paper sheet P. Then, after performing the post-processing for the printed paper sheet P, the post-processing portion 107 discharges the paper sheet P to a discharge tray 71.

[Hardware Configuration of Image Forming Apparatus]

Figure 3:
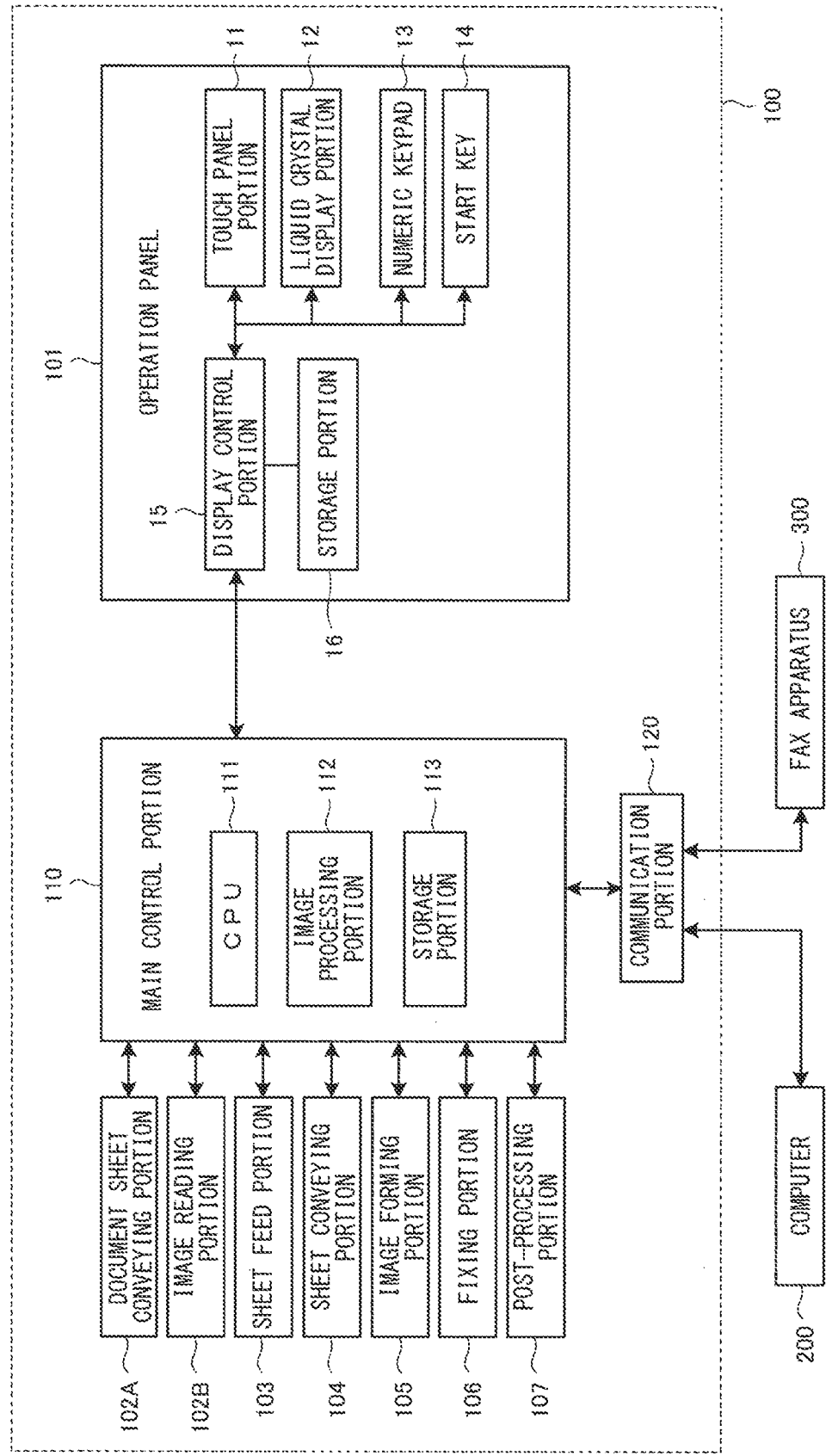
FIG. 3 is a block diagram showing the hardware configuration of the image forming apparatus shown in FIG. 1.

The image forming apparatus 100 includes a main control portion 110 as shown in FIG. 3. The main control portion 110 includes a CPU 111 which is a central processing unit, an image processing portion 112, and a storage portion 113. The image processing portion 112 has a dedicated ASIC for image processing, a memory, and the like, and performs various image processes (such as expansion/reduction, density conversion, and data form conversion) for image data. The storage portion 113 has a ROM, a RAM, an HDD, and the like. For example, a program and data needed for executing a function are stored in the ROM, and the program and the data are expanded on the RAM.

The main control portion 110 is connected to the document sheet conveying portion 102A, the image reading portion 102B, the sheet feed portion 103, the paper sheet conveying portion 104, the image forming portion 105, the fixing portion 106, the post-processing portion 107, and the like. The main control portion 110 performs overall control, image processing control, driving control for a motor that rotates each rotational body, and the like, based on the program and the data stored in the storage portion 113.

The operation panel 101 is also connected to the main control portion 110. The operation panel 101 includes a display control portion 15 connected to the main control portion 110. The display control portion 15 has a CPU and the like, and receives an instruction from the main control portion 110, to control the display operation of the operation panel 101. For example, when a user has touched a software key displayed on the liquid crystal display portion 12 via the touch panel portion 11, the display control portion 15 detects the coordinates of the touched position based on the output of the touch panel portion 11. That is, the display control portion 15 detects the software key touched via the touch panel portion 11 by the user (the software key designated by the user). A storage portion 16 is connected to the display control portion 15. Data indicating the correspondence between the output of the touch panel portion 11 and the coordinates of the touched positions is stored in the storage portion 16. As another embodiment, it is conceivable that the main control portion 110 also has the function of the display control portion 15 of the operation panel 101 so that the main control portion 110 controls the touch panel portion 11, the liquid crystal display portion 12, and the like.

In addition, the main control portion 110 is connected to a communication portion 120. The communication portion 120 is, for example, connected in a communicable manner to an external computer 200 via a network. Thus, the image forming apparatus 100 can perform printing based on image data transmitted from the computer 200, and also transmit image data obtained by scanning to the computer 200. In addition, the communication portion 120 may have a modem, and in this case, the image forming apparatus 100 can perform fax communication with an external fax apparatus 300 via a network such as a telephone line.

[Display Screen of Operation Panel]

Figure 4:
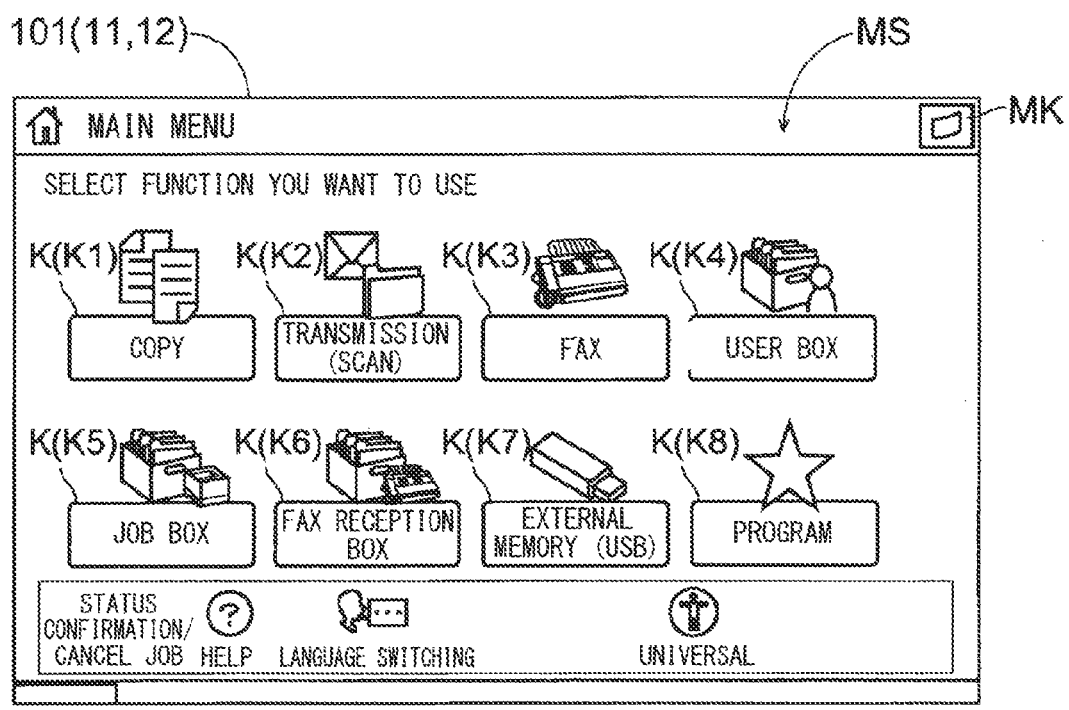
FIG. 4 is a diagram showing an example of a screen (main menu screen) displayed on the display input device of the image forming apparatus shown in FIG. 1.

When the main power supply of the operation panel 101 is turned on, the operation panel 101 displays, as an initial screen, a main menu screen MS as shown in FIG. 4. On the main menu screen MS, a plurality of software keys K respectively corresponding to a plurality of types of functions are provided for accepting, from a user, an instruction to select a function to be used among a plurality of functions.

On the main menu screen MS, when a user has designated a function to be used, the operation panel 101 displays a setting screen (for example, a setting screen SS shown in FIG. 5) that accepts instructions such as a setting instruction about the designated function. Specifically, when a display position of one of the plurality of software keys K is touched via the touch panel portion 11 by a user, the operation panel 101 displays a setting screen that accepts instructions such as a setting instruction about a function corresponding to the software key K.

Figure 5:
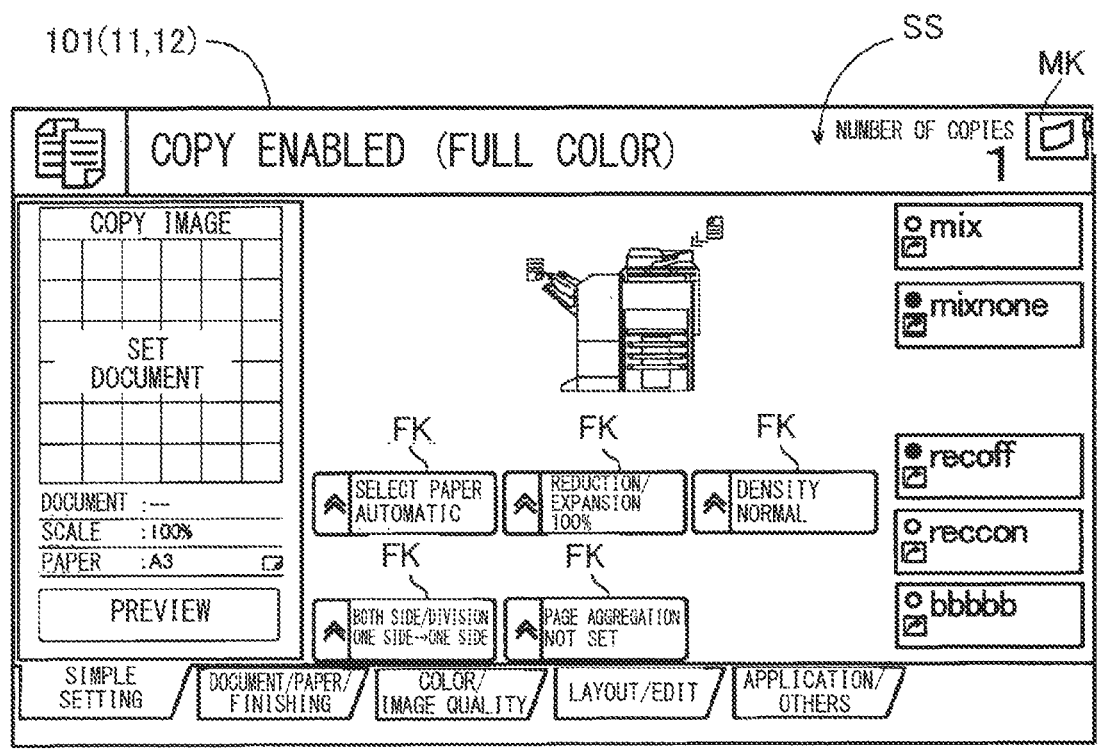
FIG. 5 is a diagram showing an example of a screen (setting screen of a copy function) displayed on the display input device of the image forming apparatus shown in FIG. 1.

For example, when a display position of a software key K1 is touched via the touch panel portion 11 by a user, the operation panel 101 displays a setting screen SS that accepts a setting instruction for a copy function, as shown in FIG. 5. On the setting screen SS of the copy function, a plurality of setting keys FK respectively corresponding to a plurality of setting items about the copy function, are provided. FIG. 5 shows the setting screen SS on which, as an example, a plurality of setting keys FK respectively corresponding to setting items of paper selection, reduction/expansion, density, both side/division, and page aggregation are provided. On the plurality of setting keys FK, the current setting values of the corresponding setting items are indicated. When one of the plurality of setting keys FK is touched and designated via the touch panel portion 11 by a user, the operation panel 101 displays, for example, a screen (not shown) that allows the user to input the setting value of the setting item corresponding to the designated setting key FK. Thus, the user can recognize the current setting values of the plurality of setting items about the copy function, and can change each setting value.

Returning to FIG. 4, when a display position of a software key K2 is touched via the touch panel portion 11 by a user, the operation panel 101 displays a setting screen (not shown) that accepts a setting instruction for the transmission (scan) function. On the setting screen of the transmission (scan) function, the user can perform an operation such as designation of a transmission destination of image data obtained by scanning. In addition, when a display position of a software key K3 is touched via the touch panel portion 11 by a user, the operation panel 101 displays a setting screen (not shown) that accepts a setting instruction for the fax function. On the setting screen of the fax function, the user can perform an operation such as input of a fax number.

In addition, when a display position of a software key K4 is touched via the touch panel portion 11 by a user, the operation panel 101 displays a setting screen (not shown) that accepts a setting instruction for a user box function which is one of the box functions. It is noted that the user box function is a function of storing image data obtained by scanning, or performing printing based on the stored image data. On the setting screen of the user box function, a user can perform an operation such as designation of a box to be used.

In addition, when a display position of a software key K5 is touched via the touch panel portion 11 by a user, the operation panel 101 displays a setting screen (not shown) that accepts a setting instruction for a job box function which is one of the box functions. In addition, when a display position of the software key K6 is touched via the touch panel portion 11 by a user, the operation panel 101 displays a setting screen (not shown) that accepts a setting instruction for a fax box function which is one of the box functions. It is noted that the job box function is a function of storing image data transmitted from the computer 200 to the image forming apparatus 100, or performing printing based on the stored image data. In addition, the fax box function is a function of storing fax data received by the communication portion 120, or performing printing based on the stored fax data.

In addition, when a display position of a software key K7 is touched via the touch panel portion 11 by a user, the operation panel 101 displays a setting screen (not shown) that accepts a setting instruction for a function (hereinafter, referred to as an external memory function) utilizing an external memory. It is noted that the external memory function is a function of performing printing based on image data stored in the external memory or storing image data into the external memory.

It is noted that a software key K8 is a software key K corresponding to the program function. When a display position of the software key K8 is touched via the touch panel portion 11 by a user, the operation panel 101 displays a program selection screen (not shown) that accepts, from a user, an instruction to select a program to be called among registered programs. It is noted that the program function is a function of registering, as a program, one or more setting items (setting values) selected in advance by a user among a plurality of setting items about functions such as the copy function and/or the transmission (scan) function.

[Creation of Object]

In the present embodiment, an object OB (see FIG. 7) such as an electronic label created by a user can be displayed being overlaid on various display screens (a main menu screen MS, a setting screen SS, or the like). For example, on the main menu screen MS or the setting screen SS, as shown in FIGS. 4 to 5, a creation key MK that accepts an instruction to create an object OB from a user is provided. It is noted that a hardware key corresponding to the creation key MK may be provided on the operation panel 101.

Figure 6:
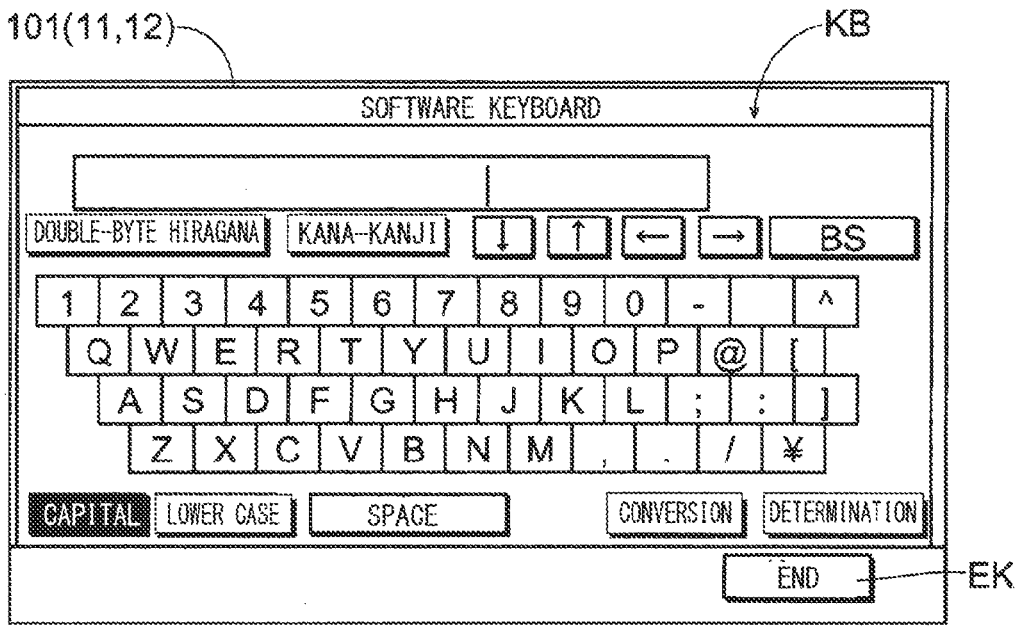
FIG. 6 is a diagram showing an example of a screen (screen on which a software keyboard for creating an object (electronic label) is provided) displayed on the display input device of the image forming apparatus shown in FIG. 1.
Figure 7:
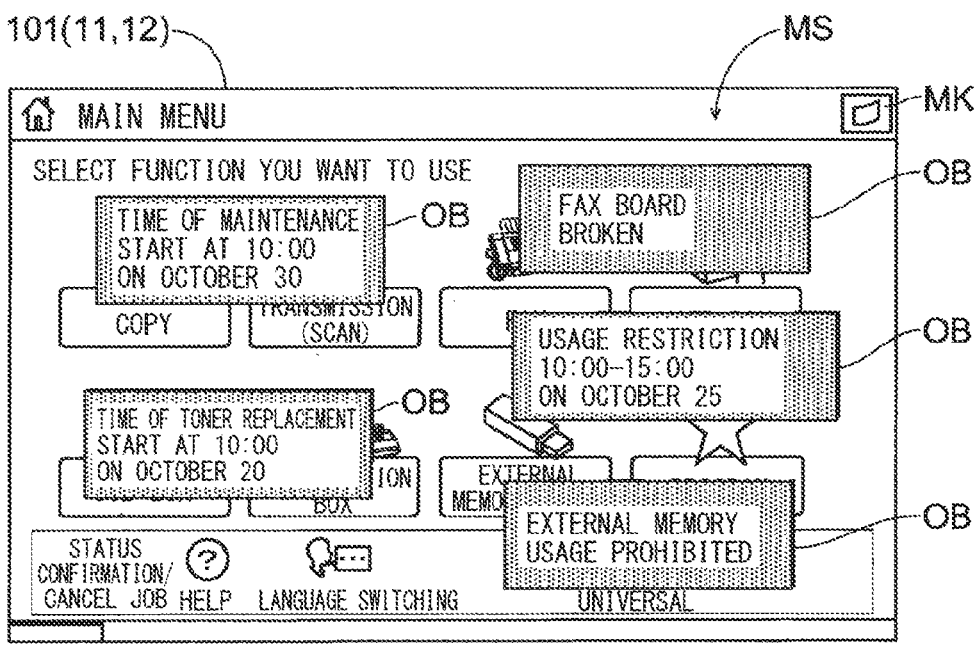
FIG. 7 is a diagram showing a screen on which objects (electronic labels) are provided, displayed on the display input device of the image forming apparatus shown in FIG. 1.

When a display position of the creation key MK is touched by a user via the touch panel portion 11, the operation panel 101 displays a software keyboard KB that accepts, from a user, an input of a character (including a number, a special symbol, etc.) to be indicated on the object OB (see FIG. 7), as shown in FIG. 6. Thus, the user can input a message to be indicated on the object OB. Then, after inputting a desired message, the user touches a display position of an end key EK via the touch panel portion 11. In response to this operation, the operation panel 101 displays the object OB indicating the message inputted by the user so as to be overlaid on the display screen. FIG. 7 shows an example of the display screen on which such objects OB are provided. It is noted that FIG. 7 shows the case where a plurality of objects OB are displayed being overlaid on the main menu screen MS.

[Movement of Objects]

For example, in order to move an object OB, a user performs an operation (drag-and-drop operation) of touching the display position of the object OB that is a movement target and sliding the touched position while keeping the touched state, whereby the user can move the object OB that is the movement target to a desired position. However, in this method, if there are a plurality of objects OB that are movement targets, a user needs to move one by one each of the plurality of objects OB that are movement targets, thus bothering the user.

In order to resolve such inconvenience, the present embodiment allows collective movement of all the objects OB that are movement targets. Specifically, while the liquid crystal display portion 12 is displaying a screen on which the objects OB are provided, when a multipoint touching operation of touching a plurality of points (for example, three or more points) on the touch panel portion 11 at the same time is performed on the touch panel portion 11 and then an operation of moving objects OB that are movement targets among the objects OB being displayed is performed on the touch panel portion 11, if the distance (for example, the distance between two points having the largest interval therebetween among the plurality of points) between the endmost two points among the plurality of points touched by the multipoint touching operation is equal to or larger than a predetermined threshold distance, the display control portion 15 of the operation panel 101 instructs the liquid crystal display portion 12 to collectively move all the objects OB that are movement targets. For example, based on the output from the touch panel portion 11, the display control portion 15 recognizes the coordinates of each of the endmost two points touched by the multipoint touching operation, and calculates the distance between the endmost two points touched by the multipoint touching operation, from the values of the coordinates of those two points. Then, the display control portion 15 determines whether or not the calculated distance is equal to or larger than the threshold distance, by comparison between the calculated distance and the threshold distance. It is noted that when a screen on which a plurality of objects OB are provided is displayed, all the plurality of objects OB can be treated as movement targets or only a designated object OB among the plurality of objects OB can be selectively treated as a movement target.

The threshold distance used as a determination reference for whether or not the touch panel portion 11 has accepted a multipoint touching operation which is one operation of moving an object OB that is a movement target, is 3 cm, for example. Here, depending on the specifications of the touch panel portion 11, even if a touching operation is performed with a one finger on the touch panel portion 11, a plurality of touched points can be detected from the touching operation by the one finger. However, normally, in such a touching operation by one finger, the distance between the endmost two points among a plurality of touched points cannot be equal to or larger than 3 cm. Accordingly, in the present embodiment, by setting the threshold distance at 3 cm, a multipoint touching operation which is one operation of moving objects OB that are movement targets is differentiated from a touching operation by one finger.

Figure 8:
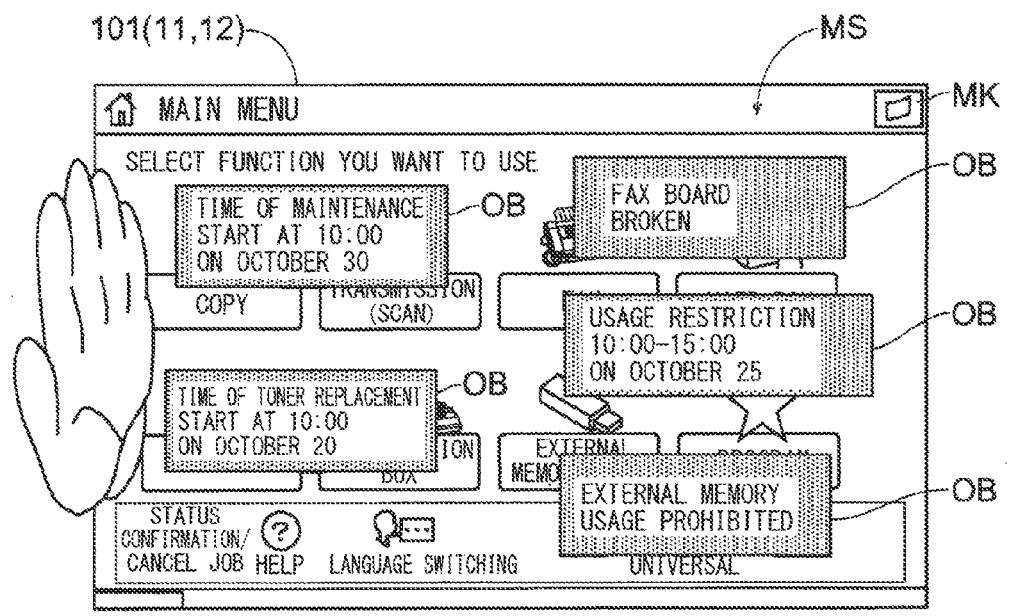
FIG. 8 is a diagram for explaining an operation for moving objects on the display input device of the image forming apparatus shown in FIG. 1.
Figure 9:
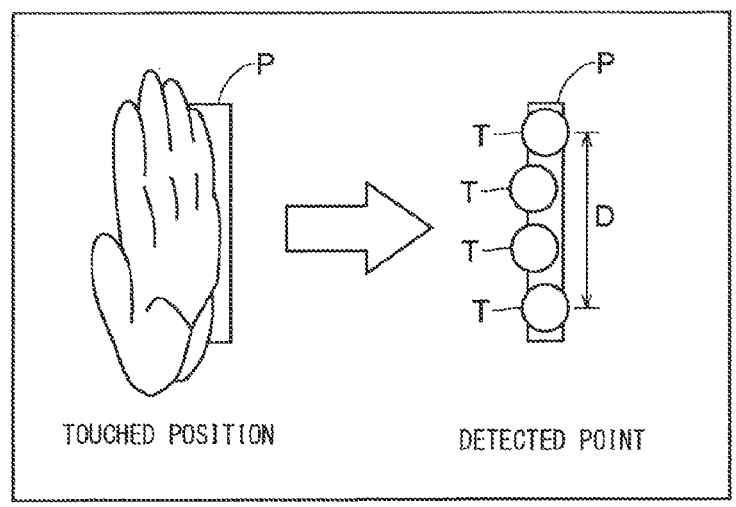
FIG. 9 is a diagram for explaining an operation for moving objects on the display input device of the image forming apparatus shown in FIG. 1.

In the present embodiment, in order to move objects OB, first, as shown in FIG. 8, a user performs a multipoint touching operation of touching a plurality of points on the touch panel portion 11 at the same time such that the distance between the endmost two points among the plurality of touched points is equal to or larger than the threshold distance. For example, by performing a touching operation by a palmar side of a hand on the touch panel portion 11, as shown in FIG. 9, a plurality of touched points T (detected points) are detected at a touched position P, and a distance D between the endmost two points among the plurality of touched points T becomes equal to or larger than the threshold distance (for example, 3 cm).

Then, after performing the multipoint touching operation, the user to move the objects OB performs an operation of moving the objects OB that are movement targets, on the touch panel portion 11. Hereinafter, the operation of moving the objects OB that are movement targets may be referred to as an object collective movement operation.

For example, after the multipoint touching operation, when a sliding operation of sliding the touched position while keeping touching the plurality of touched points is performed on the touch panel portion 11, the display control portion 15 of the operation panel 101 determines that the touch panel portion 11 has accepted the object collective movement operation. For example, in the state where the number of touched points (detected points) is kept to be more than one and the distribution of the plurality of touched points is kept within a predetermined range, when the movement amount of the plurality of touched points has exceeded a predetermined movement amount, the display control portion 15 recognizes that the sliding operation has been performed on the touch panel portion 11.

Then, after the multipoint touching operation, when a sliding operation of sliding the touched position while keeping touching the plurality of touched points is performed as an object collective movement operation on the touch panel portion 11, if the distance between the endmost two points among the plurality of points touched by the multipoint touching operation is equal to or larger than the threshold distance, the display control portion 15 instructs the liquid crystal display portion 12 to collectively move all objects OB1 (see FIG. 10) that are the movement targets in the sliding direction (one of up, down, right, and left directions) of the sliding operation. For example, based on the output from the touch panel portion 11, the display control portion 15 obtains the touched position (coordinates) at the start of the sliding operation and the touched position (coordinates) at the end of the sliding operation, thereby recognizing which the sliding direction of the sliding operation is, among up, down, right, or left direction.

Figure 10:
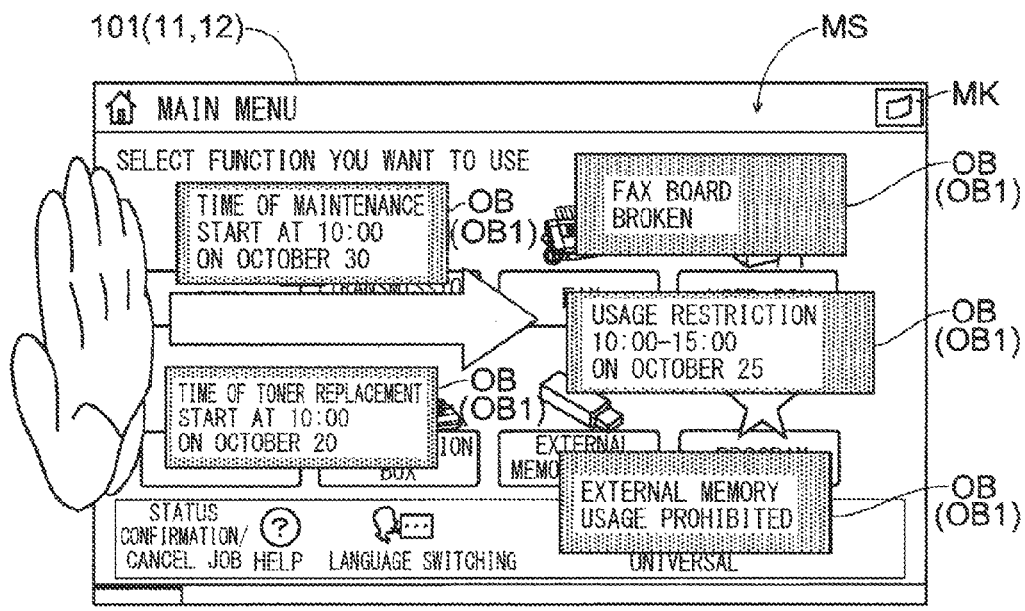
FIG. 10 is a diagram for explaining an operation for moving objects on the display input device of the image forming apparatus shown in FIG. 1.

As an example, as shown in FIG. 10, it will be assumed that a multipoint touching operation is performed on the left end of the screen and the sliding direction of the sliding operation performed thereafter is the right direction of the screen. It is noted that an outlined arrow in FIG. 10 indicates the sliding direction of the sliding operation. In this case, the display control portion 15 of the operation panel 101 recognizes, as movement targets, objects OB displayed on the sliding direction side of the sliding operation with respect to the touched position of the multipoint touching operation. That is, in the example shown in FIG. 10, all the objects OB being displayed are regarded as objects OB1 that are movement targets. Then, the display control portion 15 instructs the liquid crystal display portion 12 to collectively move all the objects OB1 that are movement targets in the sliding direction of the sliding operation (for example, move them to the right end of the screen).

Figure 11:
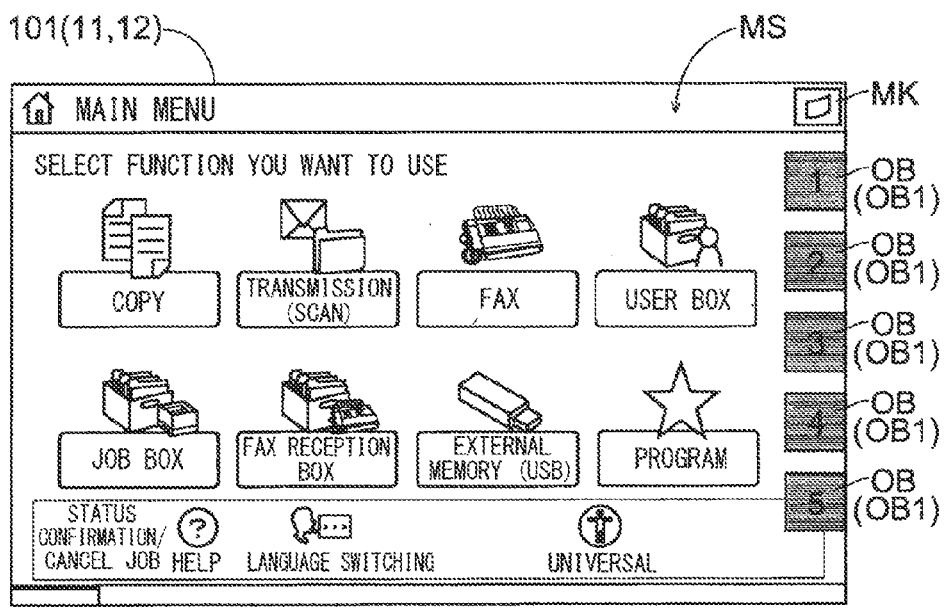
FIG. 11 is a diagram for explaining the state after the objects have been moved by the operation shown in FIG. 10.
Figure 12:
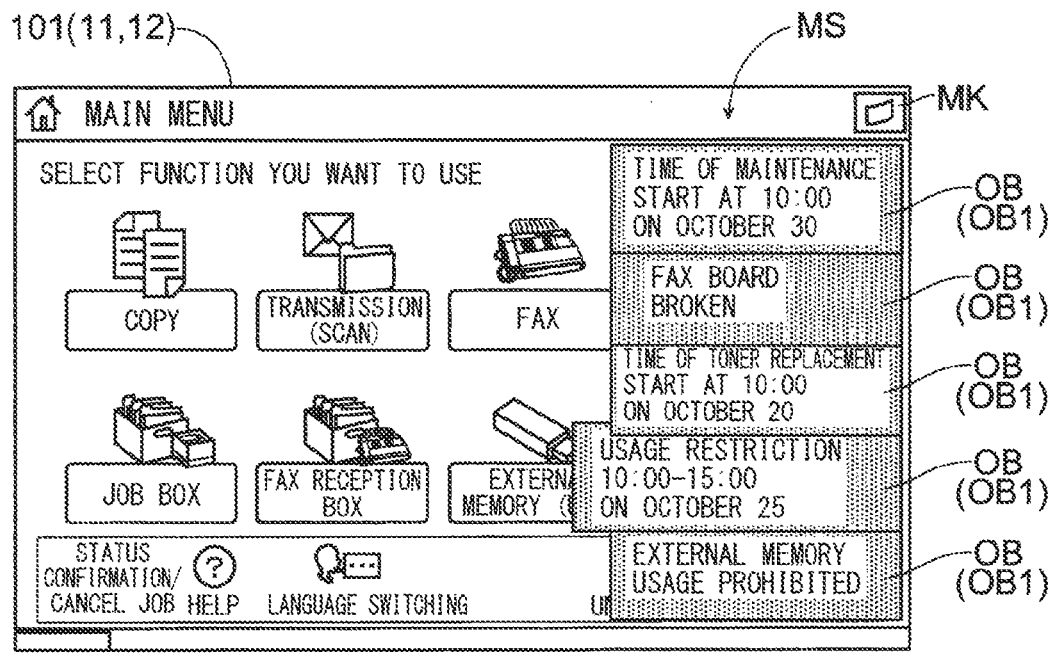
FIG. 12 is a diagram (modification) for explaining the state after the objects have been moved by the operation shown in FIG. 10.

At this time, as shown in FIG. 11, the liquid crystal display portion 12 reduces the display size of the objects OB1 that are movement targets, and displays identification information (for example, a number) for identifying the reduced objects OB1 that are movement targets, in the display areas of the objects OB1 that are movement targets. Thus, the background screen becomes easy to view. In addition, since the identification information is added to the reduced objects OB1 that are movement targets, the reduced objects OB1 that are movement targets become easy to identify. Further, the liquid crystal display portion 12 displays the reduced objects OB1 that are movement targets such that they contact an edge of the display screen. Thus, of the background screen, an area having been hidden by the objects OB1 that are movement targets largely appears, whereby the background screen becomes easy to view. Alternatively, as shown in FIG. 12, the liquid crystal display portion 12 may merely move the objects OB1 that are movement targets, without reducing the display size of the objects OB1 that are movement targets. In this case, if there are many objects OB1 that are movement targets, the liquid crystal display portion 12 may make the objects OB1 that are movement targets, partially overlapped with each other. However, although not shown, if there are a few objects OB1 that are movement targets, the liquid crystal display portion 12 may align the objects OB1 that are movement targets so as to be away from each other at predetermined intervals.

Figure 13:
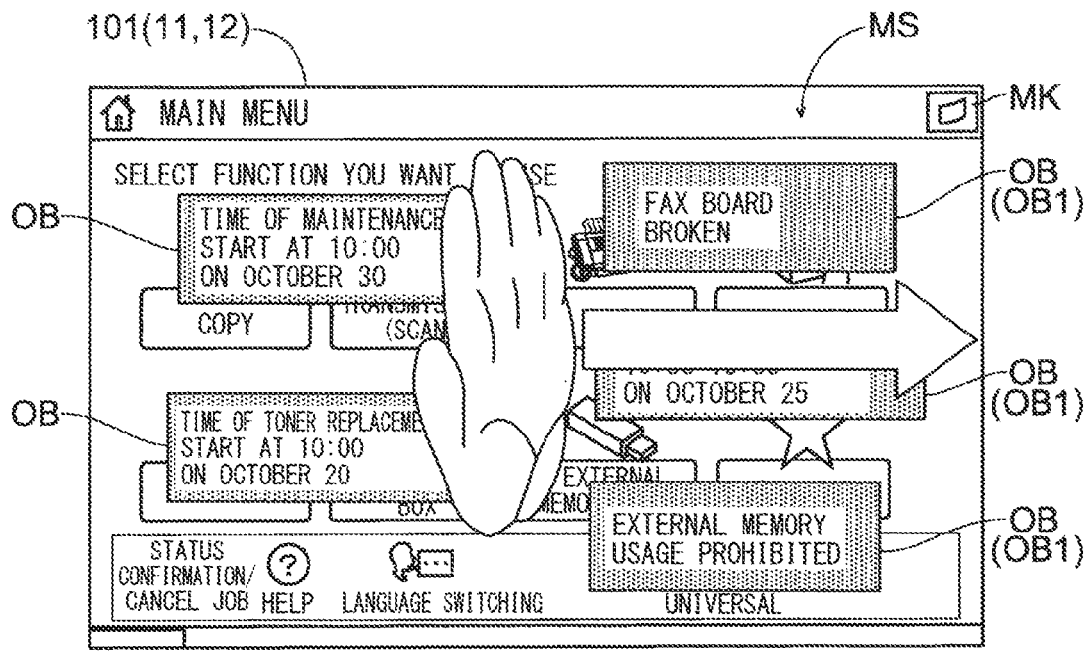
FIG. 13 is a diagram for explaining an operation for moving objects on the display input device of the image forming apparatus shown in FIG. 1.
Figure 14:
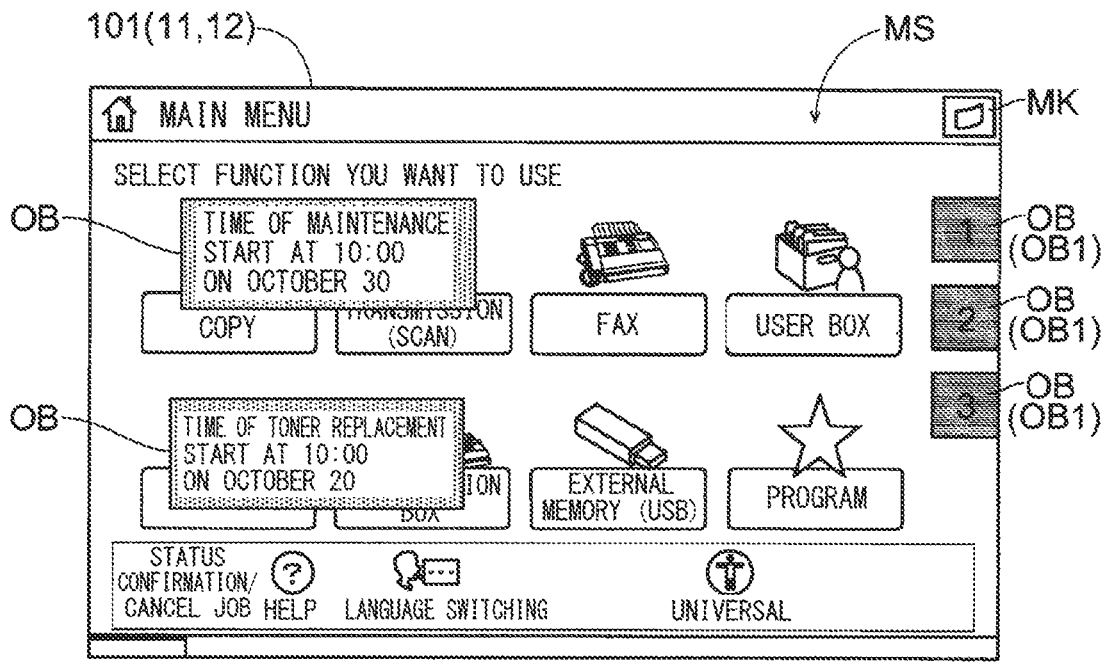
FIG. 14 is a diagram for explaining the state after the objects have been moved by the operation shown in FIG. 13.

In addition, as another example, as shown in FIG. 13, it will be assumed that the multipoint touching operation is performed substantially at the center of the screen and the sliding direction of the sliding operation performed thereafter is the right direction of the screen. Further, it will be assumed that the objects OB being displayed are distributed on both of the right side and the left side of the touched position of the multipoint touching operation. In this case, the display control portion 15 of the operation panel 101 recognizes, as movement targets, only objects OB displayed on the sliding direction side of the sliding operation with respect to the touched position of the multipoint touching operation. That is, in the example shown in FIG. 13, the liquid crystal display portion 12 recognizes, as movement targets, the objects OB displayed on the sliding direction side (the right side of the screen) of the sliding operation with respect to the touched position (substantially the center of the screen) of the multipoint touching operation, but does not recognize, as movement targets, the objects OB displayed on the side (the left side of the screen) opposite to the sliding direction side of the sliding operation with respect to the touched position (substantially the center of the screen) of the multipoint touching operation. Therefore, when the operation shown in FIG. 13 is performed, only the objects OB1 that are movement targets, which are displayed on the right side of the screen with respect to substantially the center of the screen, are moved to the right side of the screen, but the objects OB displayed on the left side of the screen with respect to substantially the center of the screen are not moved (see FIG. 14). Thus, the convenience is improved for a user that desires not to treat all the objects OB being displayed as movement targets (desires to treat only some of the objects OB as movement targets).

Figure 15:
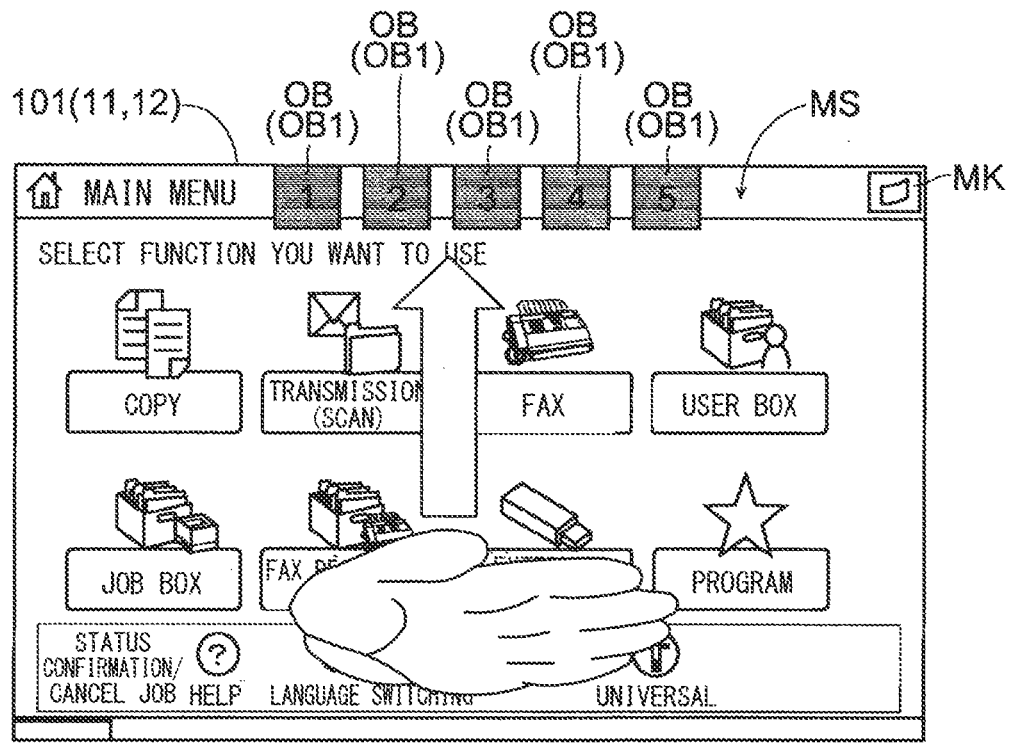
FIG. 15 is a diagram for explaining an operation for moving objects on the display input device of the image forming apparatus shown in FIG. 1, and the state after the objects have been moved.

In the above description, the case where the sliding direction of the sliding operation is the right direction of the screen has been shown as an example. However, the display control portion 15 of the operation panel 101 switches the movement direction of the objects OB1 that are movement targets, in accordance with the sliding direction of the sliding operation. That is, although not shown, if the sliding direction of the sliding operation is the left direction of the screen, the display control portion 15 moves the objects OB1 that are movement targets in the left direction of the screen. In addition, if the sliding direction of the sliding operation is the up direction of the screen, the display control portion 15 moves the objects OB1 that are movement targets in the up direction of the screen (see FIG. 15). Further, if the sliding direction of the sliding operation is the down direction of the screen, the display control portion 15 moves the objects OB1 that are movement targets in the down direction of the screen (not shown).

In addition, after the liquid crystal display portion 12 has moved the objects OB1 that are movement targets in the sliding direction of the sliding operation, the display control portion 15 of the operation panel 101 executes the following processing. That is, after the multipoint touching operation, when the sliding operation is performed on the touch panel portion 11 in the sliding direction opposite to the sliding direction of the preceding sliding operation, if the distance between the endmost two points among the plurality of points touched by the multipoint touching operation is equal to or larger than the threshold distance, the display control portion 15 collectively returns, to the preceding display position, all the objects OB1 that are movement targets, which have been previously moved in the sliding direction of the preceding sliding operation. Thus, a user can collectively return all the objects OB1 that are movement targets to the preceding display position, by a simple operation. In addition, the sliding operation which is one operation of returning the objects OB1 that are movement targets to the preceding display position can be performed by only changing the sliding direction of the present sliding operation to the direction opposite to the sliding direction of the preceding sliding operation, and thus can be intuitively performed and easily understood.

Figure 16:
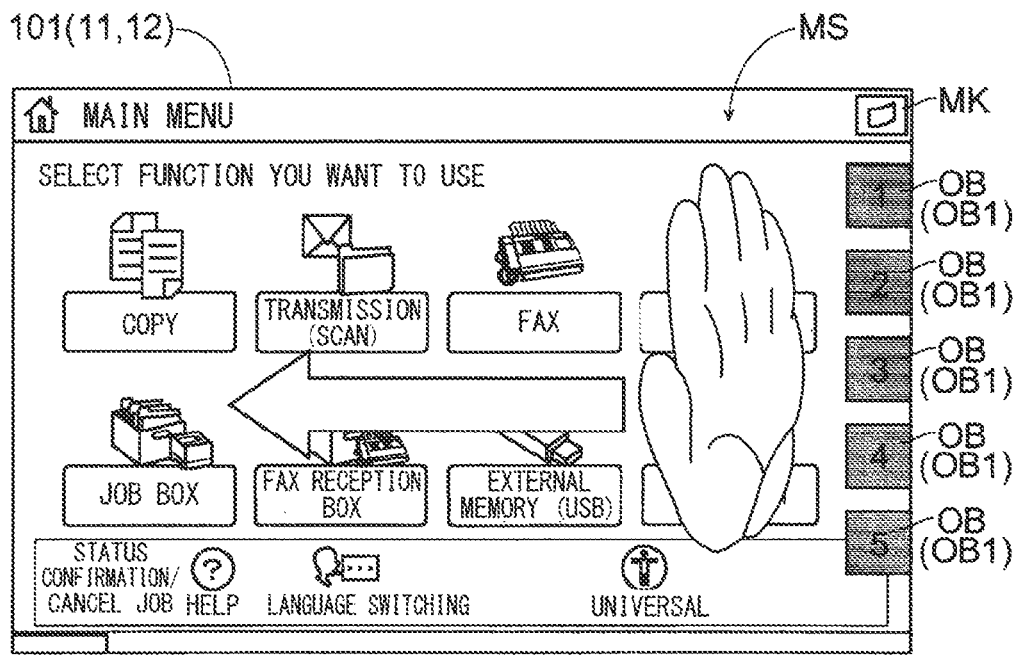
FIG. 16 is a diagram for explaining an operation for returning, to the preceding display position, the objects that have been moved on the display input device of the image forming apparatus shown in FIG. 1.

For example, it will be assumed that the objects OB1 that are movement targets have been moved in the right direction of the screen by the operation shown in FIG. 10. In this case, in order to return the objects OB1 that are movement targets to the preceding display position, as shown in FIG. 16, a user performs a multipoint touching operation on the right end of the screen and then performs a sliding operation in a sliding direction (the left direction of the screen) opposite to the sliding direction of the preceding sliding operation. In response to this operation, the display control portion 15 of the operation panel 101 instructs the liquid crystal display portion 12 to return, to the preceding display position, all the objects OB1 that are movement targets, which have been previously moved in the sliding direction of the preceding sliding operation. That is, they return to the state shown in FIG. 7.

In addition, after the multipoint touching operation, also when an operation (hereinafter, referred to as a tapping operation) of releasing the touched state within a predetermined time and then touching a plurality of points at the same time again is performed on the touch panel portion 11, the display control portion 15 of the operation panel 101 determines that the touch panel portion 11 has accepted an object collective movement operation. Then, after the multipoint touching operation, when the tapping operation of releasing the touched state within a predetermined time and then touching a plurality of points at the same time again is performed as an object collective movement operation on the touch panel portion 11, if the distance between the endmost two points among the plurality of points touched by the multipoint touching operation is equal to or larger than the threshold distance, the display control portion 15 instructs the liquid crystal display portion 12 to move all the objects OB1 (see FIG. 17) that are movement targets to the touched position of the multipoint touching operation. Thus, by adjusting the touched position of the multipoint touching operation, a user can collectively move all the objects OB1 that are movement targets to a desired position.

Figure 17:
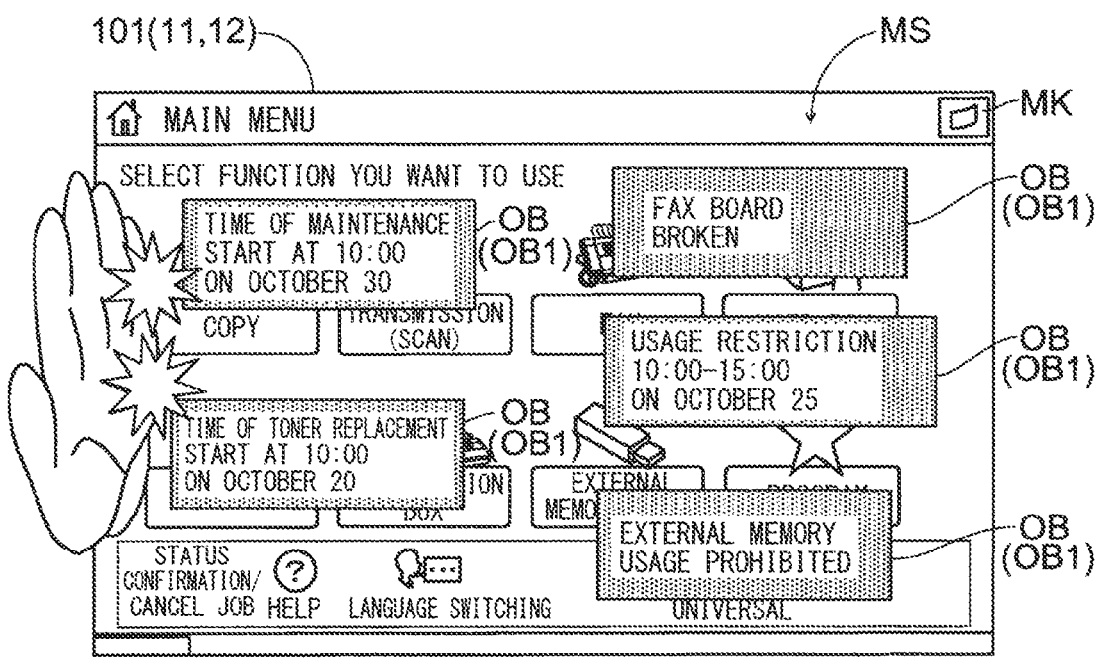
FIG. 17 is a diagram for explaining an operation for moving objects on the display input device of the image forming apparatus shown in FIG. 1.
Figure 18:
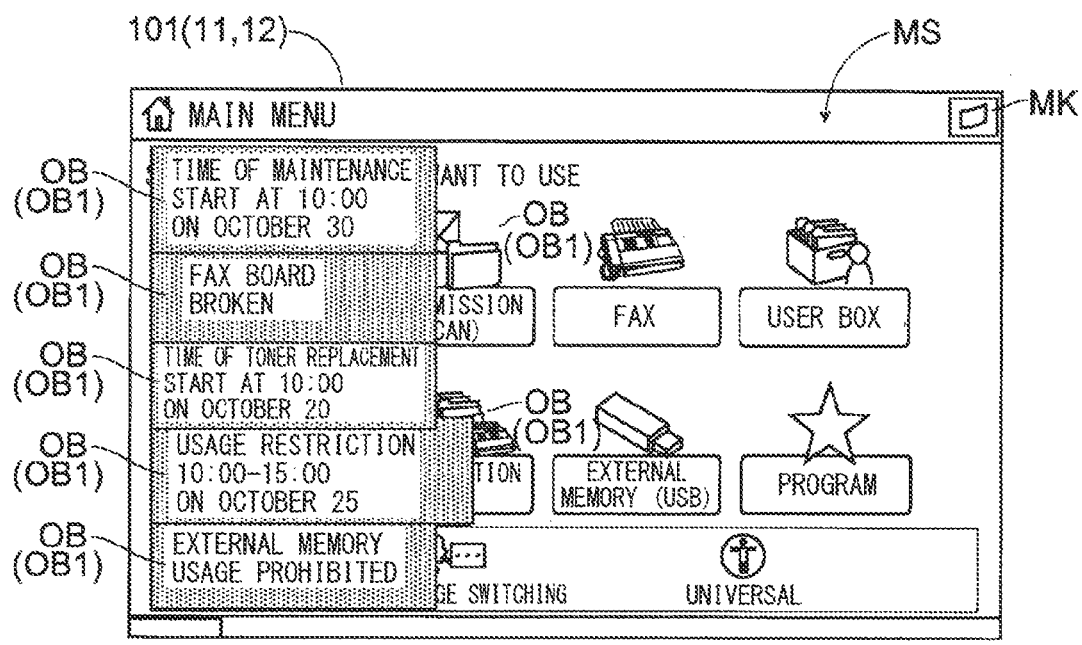
FIG. 18 is a diagram for explaining the state after the objects have been moved by the operation shown in FIG. 17.

As an example, as shown in FIG. 17, it will be assumed that after a multipoint touching operation, a tapping operation of releasing the touched state within a predetermined time and then touching a plurality of points at the same time again is performed on the left end of the screen. In this case, the display control portion 15 of the operation panel 101 recognizes all the objects OB being displayed, as objects OB1 that are movement targets. Then, the display control portion 15 instructs the liquid crystal display portion 12 to collectively move all the objects OB1 that are movement targets to the touched position of the multipoint touching operation. That is, as shown in FIG. 18, all the objects OB1 that are movement targets are moved to the left end of the screen.

At this time, the liquid crystal display portion 12 aligns the ends on the movement direction side (the touched position side of the multipoint touching operation) of all the objects OB1 that are movement targets. Then, if there are many objects OB1 that are movement targets, the objects OB1 that are movement targets are partially overlapped with each other. Alternatively, although not shown, if there are a few objects OB1 that are movement targets, the objects OB1 that are movement targets may be aligned so as to be away from each other at predetermined intervals. In addition, as shown in FIG. 11, the display size of the objects OB1 that are movement targets may be reduced, and identification information for identifying the reduced objects OB1 that are movement targets may be displayed in the display areas of the objects OB1 that are movement targets.

[Flow for Moving Objects]

Hereinafter, with reference to FIG. 19, a flow for moving objects OB will be described.

Figure 19:
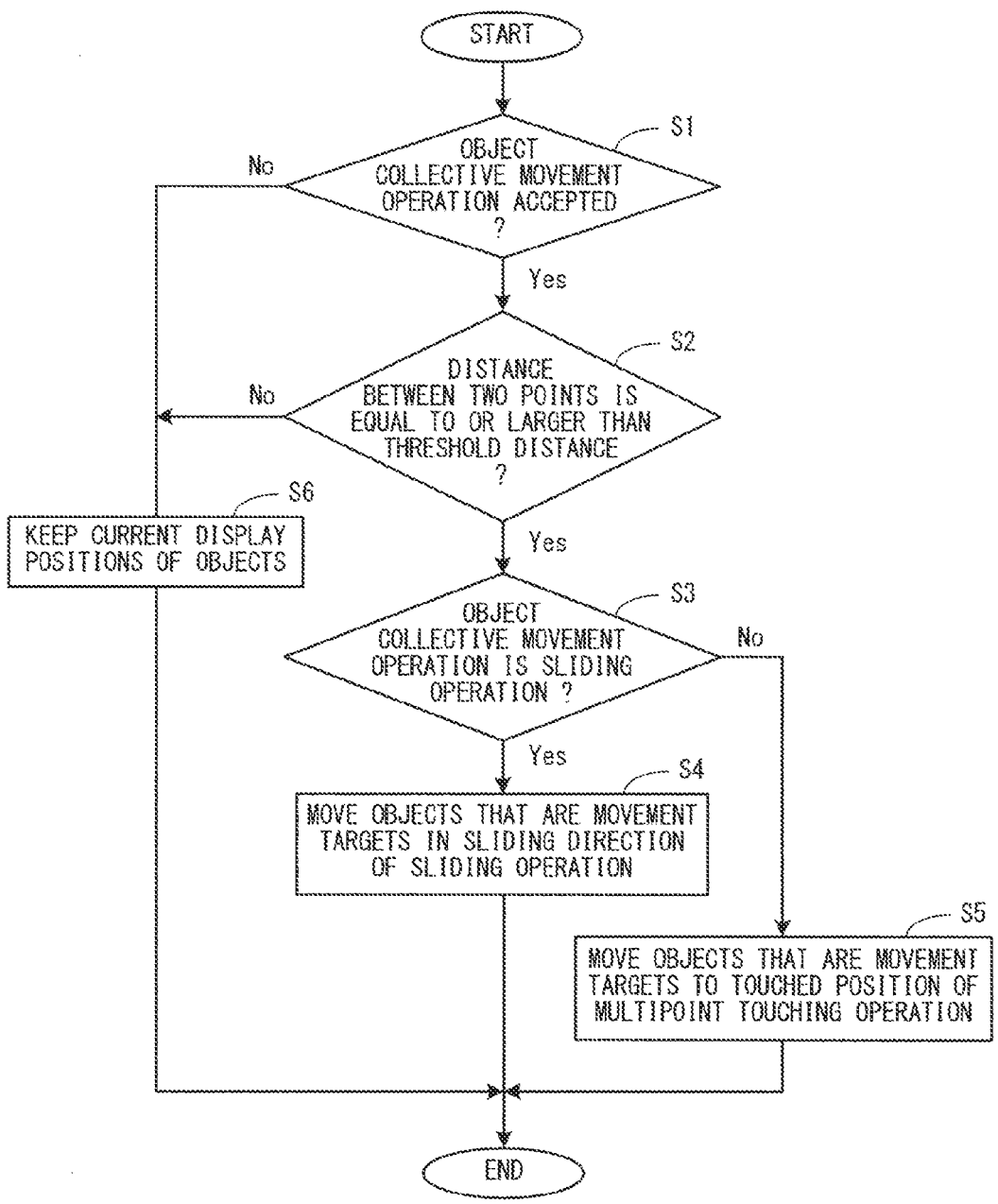
FIG. 19 is a flowchart for explaining an operation for moving objects on the display input device of the image forming apparatus shown in FIG. 1.

First, at the start of a flowchart shown in FIG. 19, the liquid crystal display portion 12 has already displayed a screen on which a plurality of objects OB are provided. Then, while the liquid crystal display portion 12 is displaying the screen on which the plurality of objects OB are provided, when a multipoint touching operation of touching a plurality of points on the touch panel portion 11 at the same time is performed, the flowchart in FIG. 19 is started. That is, the flowchart in FIG. 19 is started when a plurality of touched points are detected by the touch panel portion 11 being touched.

In step S1, the display control portion 15 determines whether or not an object collective movement operation has been performed continuously after the multipoint touching operation has been performed (whether or not the touch panel portion 11 has accepted an object collective movement operation). It is noted that the object collective movement operation refers to a sliding operation of, after a multipoint touching operation, sliding the touched position while keeping touching the plurality of touched points, or a tapping operation of, after a multipoint touching operation, releasing the touched state within a predetermined time and then touching a plurality of points at the same time again. As a result of the determination, if an object collective movement operation has been accepted, the process proceeds to step S2.

In step S2, the display control portion 15 determines whether or not the distance between the endmost two points among the plurality of points touched by the multipoint touching operation is equal to or larger than the threshold distance. As a result of the determination, if the distance is equal to or larger than the threshold distance, the process proceeds to step S3. For example, by setting in advance the threshold distance to be larger than the width of a finger pad (a portion contacting the panel plane upon a normal touching operation on the touch panel portion 11), a multipoint touching operation which is one operation of moving the objects OB1 that are movement targets can be easily differentiated from a touching operation by one finger.

In step S3, the display control portion 15 determines whether or not the object collective movement operation accepted by the touch panel portion 11 is a sliding operation. As a result of the determination, if the object collective movement operation is a sliding operation, the process proceeds to step S4. On the other hand, if the object collective movement operation is not a sliding operation, that is, if the object collective movement operation is a tapping operation, the process proceeds to step S5.

In the case of proceeding from step S3 to step S4, in step S4, the display control portion 15 instructs the liquid crystal display portion 12 to collectively move all the objects OB1 that are movement targets in the sliding direction of the sliding operation. Therefore, after the multipoint touching operation, when a sliding operation of sliding the touched position while keeping touching the plurality of touched points is performed as an operation of moving the objects OB1 that are movement targets on the touch panel portion 11, if the distance between two points among the plurality of points touched by the multipoint touching operation is equal to or larger than the threshold distance, the liquid crystal display portion 12 collectively moves all the objects OB1 that are the movement targets in the sliding direction of the sliding operation. Thus, by adjusting the sliding direction of the sliding operation, a user can collectively move all the objects OB1 that are movement targets to a desired direction. Then, the liquid crystal display portion 12 reduces the display size of the objects OB1 that are movement targets, and displays identification information for identifying the reduced objects OB1 that are movement targets, in the display areas of the objects OB1 that are movement targets.

On the other hand, in the case of proceeding from step S3 to step S5, in step S5, the display control portion 15 instructs the liquid crystal display portion 12 to collectively move all the objects OB1 that are movement targets to the touched position of the multipoint touching operation. Then, the liquid crystal display portion 12 aligns the ends on the movement direction side (the touched position side of the multipoint touching operation) of all the objects OB1 that are movement targets. Thus, the movement and the alignment of all the objects OB1 that are movement targets are both performed.

It is noted that in step S1, if no object collective movement operation has been accepted after the multipoint touching operation, the process proceeds to step S6. In addition, in step S2, also in the case where the distance between the endmost two points among the plurality of points touched by the multipoint touching operation is smaller than the threshold distance, the process proceeds to step S6. Then, in step S6, the display control portion 15 keeps the display positions of all the objects OB as they are.

In the present embodiment, as described above, after a multipoint touching operation of touching a plurality of points at the same time on the touch panel portion 11, when an operation of moving the objects OB1 that are movement targets among the objects OB being displayed is performed on the touch panel portion 11, if the distance between two points among the plurality of points touched by the multipoint touching operation is equal to or larger than a predetermined threshold distance, the liquid crystal display portion 12 (display portion) collectively moves all the objects OB1 that are movement targets. Thus, in the case where there are a plurality of objects OB1 that are movement targets, by only performing a multipoint touching operation of touching a plurality of points on the touch panel portion 11 at the same time such that the distance between two points among a plurality of touched points is equal to or larger than a predetermined threshold distance, and then performing an operation of moving the objects OB1 that are movement targets on the touch panel portion 11, all the plurality of objects OB1 that are movement targets are collectively moved. That is, all the plurality of objects OB1 that are movement targets can be collectively moved by a few operations, and therefore, it is not necessary to move one by one each of the objects OB1 that are movement targets. Thus, in the object movement operation, the number of operations to be performed by a user can be reduced, whereby the convenience for the user is improved.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display input device comprising:
a display portion that displays a screen on which objects and a setting key are provided, the objects being electronic labels and the setting key being used for setting; and
a touch panel portion that is provided on the display portion and detects a plurality of touched positions being touched by a user, wherein
after a multipoint touching operation of touching a plurality of points on the touch panel portion at the same time, when a sliding operation of sliding a touched position while keeping touching the plurality of points is performed on the touch panel portion as an operation of moving objects that are movement targets among the objects being displayed, if a distance between two points among the plurality of points touched by the multipoint touching operation is equal to or larger than a predetermined threshold distance, the display portion selects the objects that are movement targets based on positions touched by the multipoint touching operation and a movement direction specified by the operation of moving the objects even if the objects are not touched by the multipoint touching operation, and collectively moves all the objects that are the movement targets in a sliding direction of the sliding operation, and a selection and movement of the setting key are not performed.

2. The display input device according to claim 1, wherein the display portion treats, as movement targets, the objects displayed on a sliding direction side of the sliding operation with respect to a touched position of the multipoint touching operation, and does not treat, as movement targets, the objects displayed on a side opposite to the sliding direction side of the sliding operation with respect to the touched position of the multipoint touching operation.

3. The display input device according to claim 1, wherein after the objects that are the movement targets have been moved in the sliding direction of the sliding operation, when the multipoint touching operation is performed and then the sliding operation is performed on the touch panel portion in a sliding direction opposite to the sliding operation of a preceding sliding direction, if the distance between two points among the plurality of points touched by the multipoint touching operation is equal to or larger than the predetermined threshold distance, the display portion collectively returns all the objects that are the movement targets, which have been previously moved in the sliding direction of a preceding sliding operation, to a preceding display position thereof.

4. A display input device comprising:
a display portion that displays a screen on which objects and a setting key are provided, the objects being electronic labels and the setting key being used for setting; and
a touch panel portion that is provided on the display portion and detects a plurality of touched positions being touched by a user, wherein
after a multipoint touching operation of touching a plurality of points on the touch panel portion at the same time, when an operation of releasing the touched state within a predetermined time and then touching a plurality of points at the same time again is performed on the touch panel portion as the operation of moving the objects that are the movement targets, if the distance between two points among the plurality of points touched by the multipoint touching operation is equal to or larger than a predetermined threshold distance, the display portion selects the objects that are movement targets based on positions touched by the multipoint touching operation and a movement direction specified by the operation of moving the objects even if the objects are not touched by the multipoint touching operation, and collectively moves all the objects that are the movement targets, and a selection and a movement of the setting key are not performed.

5. The display input device according to claim 4, wherein when collectively moving all the objects that are the movement targets to the touched position of the multipoint touching operation, the display portion aligns ends on a movement direction side of all the objects that are the movement targets.

6. The display input device according to claim 1, wherein when the objects that are the movement targets have been moved, the display portion reduces a display size of the objects that are the movement targets, and displays identification information for identifying reduced objects that are the movement targets, in display areas of the reduced objects that are the movement targets.

7. The display input device according to claim 6, wherein the display portion displays the reduced objects that are the movement targets such that the reduced objects contact an edge of the display screen.

8. An image forming apparatus comprising:
a display portion that displays a screen on which objects and a setting key are provided, the objects being electronic labels and the setting key being used for setting; and
a touch panel portion that is provided on the display portion and detects a plurality of touched positions being touched by a user, wherein
after a multipoint touching operation of touching a plurality of points on the touch panel portion at the same time, when a sliding operation of sliding a touched position while keeping touching the plurality of points is performed on the touch panel portion as an operation of moving objects that are movement targets among the objects being displayed, if a distance between two points among the plurality of points touched by the multipoint touching operation is equal to or larger than a predetermined threshold distance, the display portion selects the objects that are movement targets based on positions touched by the multipoint touching operation and a movement direction specified by the operation of moving the objects even if the objects are not touched by the multipoint touching operation, and collectively moves all the objects that are the movement targets in a sliding direction of the sliding operation, and a selection and a movement of the setting key are not performed.

9. The image forming apparatus according to claim 8, wherein
the display portion treats, as movement targets, the objects displayed on a sliding direction side of the sliding operation with respect to a touched position of the multipoint touching operation, and does not treat, as movement targets, the objects displayed on a side opposite to the sliding direction side of the sliding operation with respect to the touched position of the multipoint touching operation.

10. The image forming apparatus according to claim 8, wherein
after the objects that are the movement targets have been moved in the sliding direction of the sliding operation, when the multipoint touching operation is performed and then the sliding operation is performed on the touch panel portion in a sliding direction opposite to the sliding operation of the preceding sliding direction, if the distance between two points among a plurality of points touched by the multipoint touching operation is equal to or larger than the predetermined threshold distance, the display portion collectively returns all the objects that are the movement targets, which have been previously moved in the sliding direction of a preceding sliding operation, to a preceding display position thereof.

11. An image forming apparatus comprising:
a display portion that displays a screen on which objects and a setting key are provided, the objects being electronic labels and the setting key being used for setting; and
a touch panel portion that is provided on the display portion and detects a plurality of touched positions being touched by a user, wherein
after a multipoint touching operation of touching a plurality of points on the touch panel portion at the same time, when an operation of releasing the touched state within a predetermined time and then touching a plurality of points at the same time again is performed as the operation of moving the objects that are the movement targets among the objects being displayed, if a distance between two points among the plurality of points touched by the multipoint touching operation is equal to or larger than a predetermined threshold distance, the display portion selects the objects that are movement targets based on positions touched by the multipoint touching operation and a movement direction specified by the operation of moving the objects even if the objects are not touched by the multipoint touching operation, and collectively moves all the objects that are the movement targets, and a selection and a movement of the setting key are not performed.

12. The image forming apparatus according to claim 11, wherein
when collectively moving all the objects that are the movement targets to the touched position of the multipoint touching operation, the display portion aligns ends on a movement direction side of all the objects that are the movement targets.

13. The image forming apparatus according to claim 8, wherein
when the objects that are the movement targets have been moved, the display portion reduces the display size of the objects that are the movement targets, and displays identification information for identifying the reduced objects that are the movement targets, in display areas of the reduced objects that are the movement targets.

14. The image forming apparatus according to claim 13, wherein
the display portion displays the reduced objects that are the movement targets such that the reduced objects contact an edge of the display screen.

15. The display input device according to claim 1, wherein the plurality of points are at least three points, and
if a distance between two points that are at farthest ends among the plurality of points is equal to or larger than the predetermined threshold distance, the display portion selects the objects that are movement targets based on the positions touched by the multipoint touching operation and the movement direction specified by the operation of moving the objects, and collectively moves all the objects that are the movement targets.

16. The image forming apparatus according to claim 8, wherein
the plurality of points are at least three points, and
if a distance between two points that are at farthest ends among the plurality of points is equal to or larger than the predetermined threshold distance, the display portion selects the objects that are movement targets based on the positions touched by the multipoint touching operation and the movement direction specified by the operation of moving the objects, and collectively moves all the objects that are the movement targets.

* * * * *